US010726528B2

(12) United States Patent
Ozaki et al.

(10) Patent No.: US 10,726,528 B2
(45) Date of Patent: Jul. 28, 2020

(54) IMAGE PROCESSING APPARATUS AND IMAGE PROCESSING METHOD FOR IMAGE PICKED UP BY TWO CAMERAS (71) Applicant: Kabushiki Kaisha Toshiba, Minato-ku, Tokyo (JP)

(72) Inventors: Nau Ozaki, Kawasaki Kanagawa (JP); Manabu Nishiyama, Setagaya Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/681,655

(22) Filed: Aug. 21, 2017

(65) Prior Publication Data
US 2018/0182078 A1 Jun. 28, 2018

(30) Foreign Application Priority Data

Dec. 27, 2016 (JP) ................. 2016-253950

(51) Int. Cl.
*G06T 5/00* (2006.01)
*G06T 7/593* (2017.01)
(Continued)

(52) U.S. Cl.
CPC ............ *G06T 5/006* (2013.01); *G06K 9/4609* (2013.01); *G06T 3/0006* (2013.01); *G06T 5/002* (2013.01);
(Continued)

(58) Field of Classification Search
CPC .......... G06T 5/006; G06T 7/80; G06T 5/002; G06T 5/50; G06T 3/0006; G06T 7/593;
(Continued)

(56) References Cited

U.S. PATENT DOCUMENTS 6,734,911 B1 * 5/2004 Lyons ................ G01S 3/781
348/169
7,268,803 B1 * 9/2007 Murata ................ G06T 3/4038
348/218.1
(Continued)

FOREIGN PATENT DOCUMENTS

JP 2006-186885 A 7/2006
JP 2008-065722 A 3/2008
(Continued)

OTHER PUBLICATIONS

Naa Dedei Tagoe et al., "A Pragmatic Approach for Lens Distortion Correction from a Fictitious Image," https://www.researchgate.net/publication/281409354, Jul. 2014, pp. 1-12.
(Continued)

*Primary Examiner* — Xuemei G Chen
(74) *Attorney, Agent, or Firm* — White & Case LLP (57) ABSTRACT According to an embodiment, an image processing apparatus includes a characteristic point detecting unit configured to detect a plurality of characteristic points in a first image and a second image imaged with two cameras having angles of view or angular velocity of line scan different from each other, a characteristic point pair determining unit configured to determine a plurality of characteristic point pairs between the first image and the second image from the detected plurality of characteristic points, a mapping parameter calculating unit configured to calculate a first parameter indicating mapping between the first image and the second image, and a distortion parameter calculating unit configured to obtain a second parameter indicating distortion of the first image and the second image from the first parameter.

14 Claims, 6 Drawing Sheets

(51) Int. Cl.
*G06T 3/00* (2006.01)
*G06T 5/50* (2006.01)
*G06K 9/46* (2006.01)
*G06T 7/80* (2017.01)
*H04N 5/217* (2011.01)

(52) U.S. Cl.
CPC ............... *G06T 5/50* (2013.01); *G06T 7/593* (2017.01); *G06T 7/80* (2017.01); *H04N 5/217* (2013.01); *G06T 2207/10021* (2013.01); *G06T 2207/10028* (2013.01); *G06T 2207/20016* (2013.01)

(58) Field of Classification Search
CPC . G06T 2207/10028; G06T 2207/10021; G06T 2207/20016; G06T 3/0075; G06T 7/33; H04N 5/217; H04N 5/2329; H04N 5/247; H04N 5/23254; G06K 9/4609; G06K 9/46
USPC ...... 345/625, 633; 348/222.1, 240.2, 36, 47, 348/118, 169, 607; 382/103, 197, 199, 382/255, 260
See application file for complete search history.

(56) References Cited

U.S. PATENT DOCUMENTS

| | | | |
|---|---|---|---|
| 8,264,551 B2 | 9/2012 | Kurata et al. | |
| 8,350,927 B2 | 1/2013 | Kaimi et al. | |
| 8,553,106 B2* | 10/2013 | Scarff | H04N 5/2258 348/240.2 |
| 8,824,833 B2* | 9/2014 | Dagher | G06T 5/004 382/260 |
| 9,665,782 B2* | 5/2017 | Seo | G06T 7/593 |
| 9,854,170 B2* | 12/2017 | Katz | H04N 5/23267 |
| 10,027,893 B2* | 7/2018 | Bell | H04N 5/23274 |
| 10,356,343 B2* | 7/2019 | Ribardo, Jr. | G06T 5/006 |
| 10,404,926 B2* | 9/2019 | Douady-Pleven | G06T 3/4038 |
| 2002/0109833 A1* | 8/2002 | Chiba | G02B 27/0012 356/124 |
| 2011/0129154 A1* | 6/2011 | Shimodaira | G06T 7/80 382/190 |
| 2012/0092559 A1* | 4/2012 | Ubillos | H04N 19/86 348/607 |
| 2013/0188069 A1* | 7/2013 | Sendik | H04N 5/217 348/222.1 |
| 2013/0307936 A1* | 11/2013 | Kim | G06K 9/6201 348/47 |
| 2014/0132707 A1* | 5/2014 | Hashimoto | G01C 3/06 348/36 |
| 2014/0153840 A1* | 6/2014 | Chiao | H04N 5/235 382/255 |
| 2014/0168378 A1* | 6/2014 | Hall | G06F 3/017 348/47 |
| 2015/0055873 A1* | 2/2015 | Lee | G06K 9/6289 382/197 |
| 2015/0103159 A1* | 4/2015 | Shashua | G06K 9/00798 348/118 |
| 2015/0123990 A1* | 5/2015 | Satoh | H04N 5/23248 345/625 |
| 2015/0145965 A1* | 5/2015 | Livyatan | B60R 1/00 348/47 |
| 2015/0229840 A1* | 8/2015 | Sawai | G06T 3/4038 348/36 |
| 2016/0012643 A1* | 1/2016 | Kezele | G06T 19/006 345/633 |
| 2016/0110878 A1* | 4/2016 | Chang | G06T 7/73 382/103 |
| 2016/0188992 A1* | 6/2016 | Hiraga | G06K 9/4604 382/199 |
| 2016/0275683 A1 | 9/2016 | Sakano et al. | |
| 2017/0026581 A1* | 1/2017 | Ryu | G06K 9/6211 |
| 2017/0032503 A1* | 2/2017 | Raichman | G06T 5/006 |
| 2017/0111582 A1* | 4/2017 | Hu | G06T 7/70 |
| 2018/0144458 A1* | 5/2018 | Xu | G06T 7/004 |
| 2018/0184010 A1* | 6/2018 | Cohen | H04N 5/2258 |
| 2019/0206073 A1* | 7/2019 | Huang | G01C 11/02 |

FOREIGN PATENT DOCUMENTS

| | | |
|---|---|---|
| JP | 5539250 B2 | 7/2014 |
| JP | 2015-106785 A | 6/2015 |
| WO | 2001-24515 A1 | 4/2001 |
| WO | 2015-182771 A1 | 12/2015 |

OTHER PUBLICATIONS

Juho Kannala et al., "A Generic Camera Model and Calibration Method for Conventional, Wide-Angle, and Fish-Eye Lenses," IEEE Transactions on Pattern Analysis and Machine Intelligence, IEEE Computer Society, USA, vol. 28, No. 1, Aug. 1, 2006, pp. 1335-1340.

European Search Report dated Oct. 27, 2017 in International Application No. 17187210.4-1906.

* cited by examiner

IMAGE PROCESSING APPARATUS AND IMAGE PROCESSING METHOD FOR IMAGE PICKED UP BY TWO CAMERAS

CROSS-REFERENCE TO RELATED APPLICATION

This application is based upon and claims the benefit of priority from the prior Japanese Patent Application No. 2016-253950 filed in Japan on Dec. 27, 2016; the entire contents of which are incorporated herein by reference.

FIELD

An embodiment described herein relates generally to an image processing apparatus and an image processing method.

BACKGROUND

Conventionally, an image processing system such as a stereo camera, which uses two cameras is known. The stereo camera can estimate a distance to an object through stereo matching utilizing parallax.

However, in such a system, a problem exists that, if optical systems or line scan speed of two cameras are different from each other, distance estimation accuracy degrades.

For example, in the case where, for example, in the two cameras, angles of view are different from each other, or exposure timings for each line are different as in a rolling shutter, image distortion is different between two images when real space is imaged. If stereo matching, or the like, is performed using two images having different distortion, distance estimation accuracy may degrade, or stereo matching processing may not be able to be accurately performed.

Further, while a technique using an acceleration sensor, or the like, to detect distortion of an image, is proposed, use of an acceleration sensor, or the like, is not preferable in terms of cost.

DETAILED DESCRIPTION

An image processing apparatus according to an embodiment includes a characteristic point detecting unit configured to detect a plurality of characteristic points in a first image and a second image imaged with two cameras having angles of view or angular velocity of line scan different from each other, a characteristic point pair determining unit configured to determine a plurality of characteristic point pairs between the first image and the second image from the detected plurality of characteristic points, a mapping parameter calculating unit configured to calculate a first parameter indicating mapping between the first image and the second image, and a distortion parameter calculating unit configured to obtain a second parameter indicating distortion of the first image and the second image from the first parameter.

An embodiment will be described below with reference to the drawings.

First Embodiment (Configuration)

Figure 1:
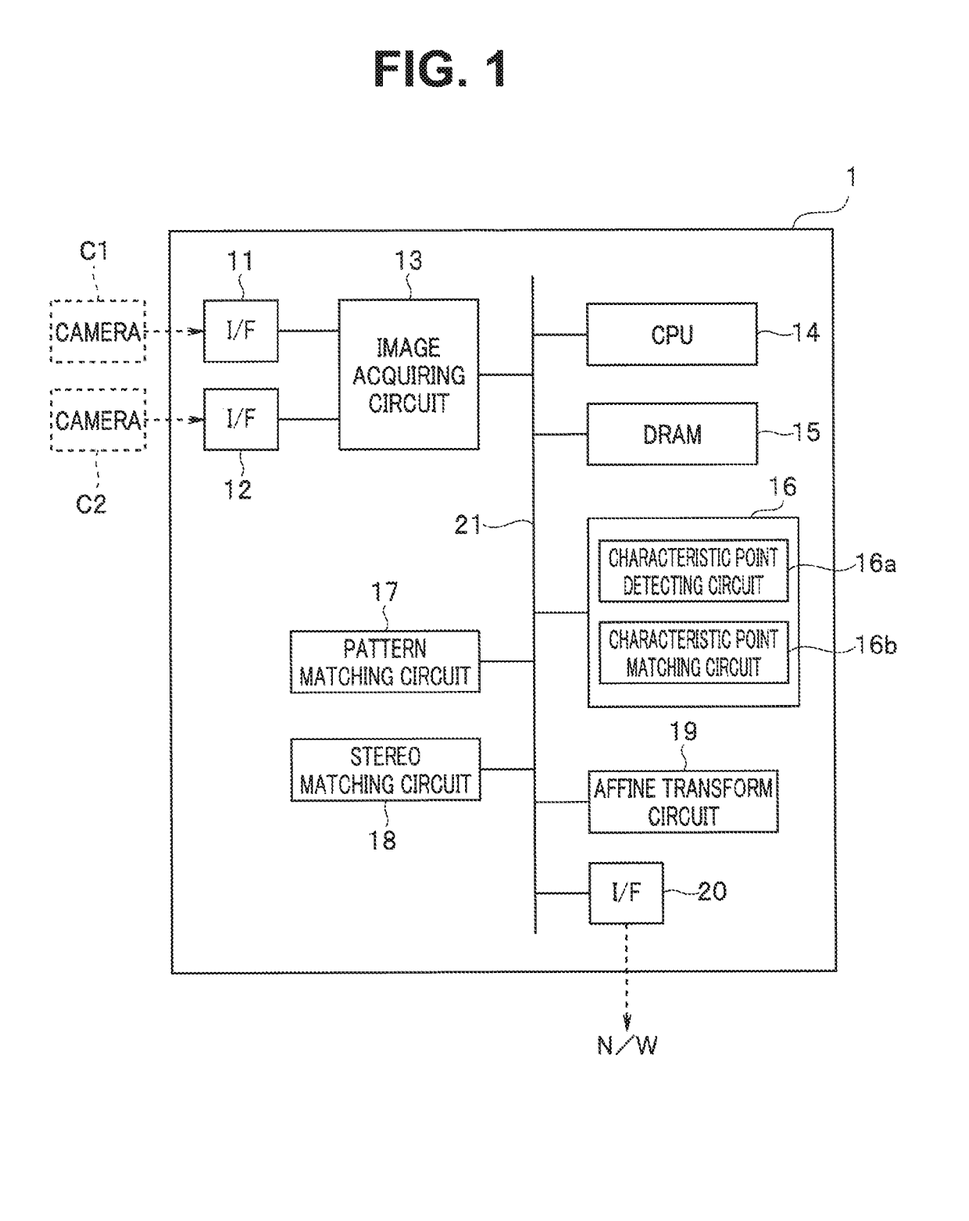
FIG. 1 is a block diagram of an image processing apparatus according to the present embodiment.

FIG. 1 is a block diagram of the image processing apparatus according to the present embodiment.

The image processing apparatus 1 includes interface circuits (hereinafter, abbreviated as I/F) 11 and 12 configured to respectively receive image signals, an image acquiring circuit 13, a central processing unit (hereinafter, abbreviated as CPU) 14, a DRAM 15, an image processing processor 16, a pattern matching circuit 17, a stereo matching circuit 18, an affine transform circuit 19 and an I/F 20 for output. The image acquiring circuit 13, the CPU 14, the DRAM 15, the image processing processor 16, the pattern matching circuit 17, the stereo matching circuit 18, the affine transform circuit 19 and the I/F 20 are connected to a bus 21, so that data can be transmitted/received to/from each other.

The image processing apparatus 1 is a semiconductor apparatus which receives input of image signals which are video signals from two cameras C1 and C2 mounted on, for example, an automobile (hereinafter, referred to as a vehicle), performs predetermined image recognition processing and outputs recognition result information.

The I/F 11 receives input of an image signal serially transmitted from the first camera C1 and outputs the image signal to the image acquiring circuit 13.

The I/F 12 receives input of an image signal serially transmitted from the second camera C2 and outputs the image signal to the image acquiring circuit 13.

The image acquiring circuit 13 acquires the two image signals from the I/F 11 and 12 under control by the CPU 14 and stores the image signals in the DRAM 15.

The CPU 14 is a control circuit which controls each circuit within the image processing apparatus 1 so that predetermined processing is performed on the acquired two image signals and predetermined output signals are output.

The CPU 14 includes a ROM which stores various kinds of operation programs, and a RAM for work. The CPU 14 performs processing of the whole image processing and performs operation of, for example, solving simultaneous equations which will be described later by executing predetermined programs stored in the ROM.

The DRAM 15 is a main memory for storing the two image signals and storing data of a processing result of each circuit.

Note that, while the DRAM 15 is included in a semiconductor chip of the image processing apparatus 1 here, the DRAM 15 may be included in a chip different from the semiconductor chip of the image processing apparatus 1 and may be connected through the bus 21.

The image processing processor 16 includes a characteristic point detecting circuit 16a and a characteristic point matching circuit 16b. The characteristic point detecting circuit 16a detects characteristic points in each image under control by the CPU 14. The characteristic point matching circuit 16b performs matching of the detected characteristic points between the two images under control by the CPU 14.

The pattern matching circuit 17 and the stereo matching circuit 18 are provided within the image processing apparatus 1 as a matching unit.

The pattern matching circuit 17 is a circuit for recognizing a predetermined target object. For example, the pattern matching circuit 17 recognizes a target object such as a person and a vehicle and outputs the recognition result to the DRAM 15. The pattern matching circuit 17 performs pattern matching on the two images, distortion of which is corrected, and outputs information of the result of the pattern matching.

The stereo matching circuit 18 obtains distances from the cameras C1 and C2 to an arbitrary point in the obtained image or the recognized object through operation. The stereo matching circuit 18 performs stereo matching on the two images, distortion of which is corrected, and outputs information of the result of the stereo matching.

Note that, while, in the present embodiment, the image processing apparatus 1 has both the pattern matching circuit 17 and the stereo matching circuit 18, the image processing apparatus 1 may have one of the pattern matching circuit 17 and the stereo matching circuit 18.

The affine transform circuit 19 executes affine transform processing for removing distortion of the images.

The I/F 20 is connected to a network (N/W), or the like, to other systems. The I/F 20 is a circuit which outputs the matching result of the matching unit. Information of the recognized target such as a person and information of a distance to the recognized target are output via the I/F 20. A control apparatus of the vehicle is connected to the network. The control apparatus of the vehicle controls the vehicle using the information from the image processing apparatus 1.

Figure 2:
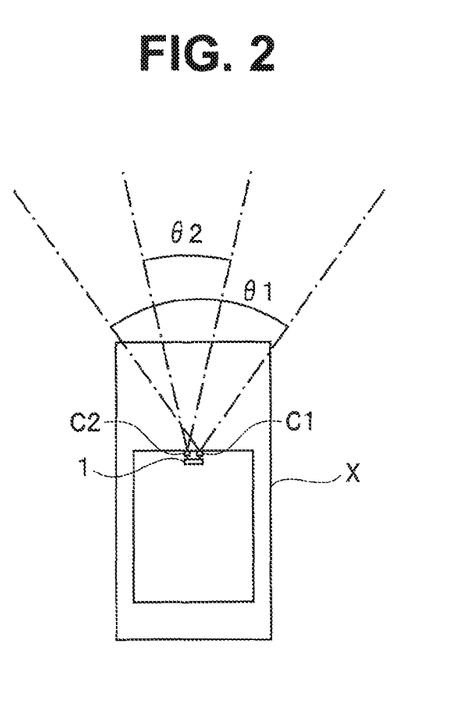
FIG. 2 is a diagram illustrating an example of a target on which the image processing apparatus according to the present embodiment is mounted.

FIG. 2 is a diagram illustrating an example of a target on which the image processing apparatus is mounted.

Here, the image processing apparatus 1 is mounted on a vehicle X as part of a forward-looking system. On the vehicle X, cameras C1 and C2 having angles of view different from each other, are mounted, and image signals from the cameras C1 and C2 are input to the image processing apparatus 1.

The cameras C1 and C2 have optical systems having focal lengths and angles of view different from each other. The camera C1 has a first optical system having an angle of view $\theta 1$, and the camera C2 has a second optical system having an angle of view $\theta 2$ which is smaller than the angle of view $\theta 1$ of the camera 1.

The camera C1 is used to detect an obstacle close from the vehicle, storming out of a person from a side, or the like. The camera C2 has an optical system for imaging a predetermined remote range and is used to detect a remote obstacle, or the like.

Hereinafter, an image obtained by the camera C1 will be also referred to as a wide-angle image, and an image obtained by the camera C2 will be also referred to as a narrow-angle image. Processing of recognizing an obstacle, or the like, is performed on each of the wide-angle image and the narrow-angle image through pattern matching processing.

Further, in a region imaged by both the cameras C1 and C2, a distance to the object can be detected through stereo measurement. In an image region where the wide-angle image overlaps with the narrow-angle image, a distance to the obstacle, or the like, recognized through pattern matching is detected through stereo matching processing.

Each of the cameras C1 and C2 has an X-Y address type solid-state imaging device such as a CMOS image sensor, and outputs an image signal in a rolling shutter scheme.

Because, an imaging sensor of a rolling shutter scheme has a time lag of imaging for each pixel line, a problem such as shear deformation of a shot image by punning and vertical expansion/contraction of the shot image by tilting, occurs. The distortion of the image is commonly called rolling shutter distortion, focal plane distortion, or the like.

An imaging device of each of the cameras C1 and C2 has a plurality of pixel lines. The camera C1 generates a wide-angle image by sequentially exposing an imaged region for each pixel line, and the camera C2 generates a narrow-angle image by sequentially exposing an imaged region which is narrower than the imaged region of the camera C1 for each pixel line.

Each of the cameras C1 and C2 images an imaged region of real space by performing line scan so as to move an exposure line in a direction orthogonal to a pixel line.

For example, when the imaging devices of the two cameras C1 and C2 are the same type and a parameter such as an exposure time period is the same, real space corresponding to the exposure line in the wide-angle camera C1 moves faster than in the camera C2. That is, the imaged region of the camera C1 is imaged at higher speed than the imaged region of the camera C2.

While images obtained by the cameras C1 and C2 which are so-called hetero stereo cameras include distortion due to lens distortion aberration and rolling shutter distortion, the rolling shutter distortion will be described below.

Figure 3:
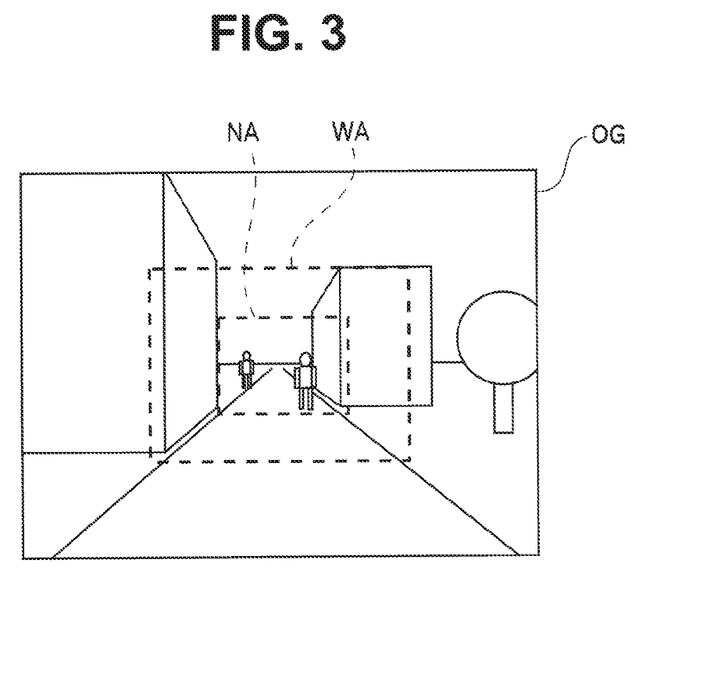
FIG. 3 is a diagram illustrating a region imaged with cameras C1 and C2 with respect to real space, according to the present embodiment.
Figure 4:
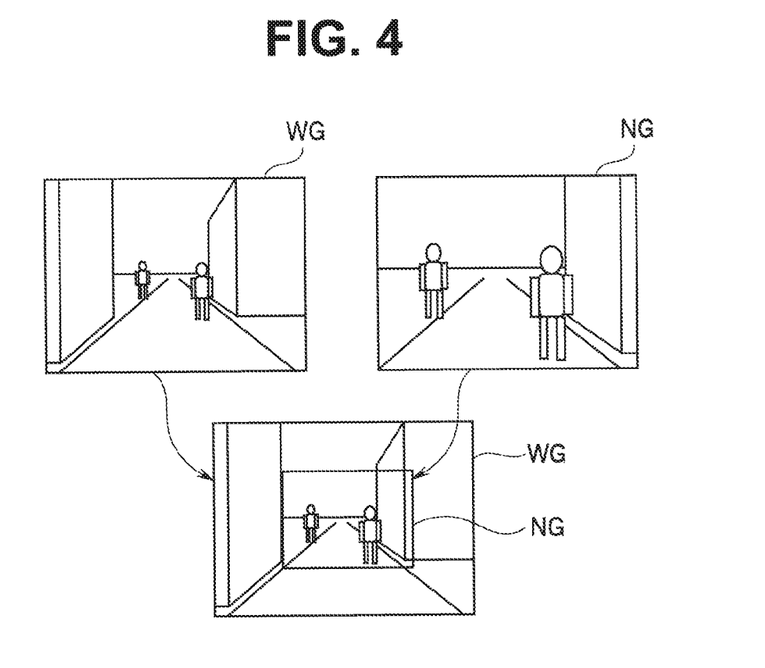
FIG. 4 is a diagram illustrating relationship between an image WG obtained by the wide-angle camera C1 and an image NG obtained by the narrow-angle camera C2, according to the present embodiment.

FIG. 3 and FIG. 4 are diagrams for explaining a range imaged with the wide-angle camera C1 and the narrow-angle camera C2. FIG. 3 is a diagram illustrating regions imaged with the cameras C1 and C2 with respect to real space.

In real space OG illustrated in FIG. 3, the cameras C1 and C2 are disposed so that the camera C1 images a region WA within the real space OG, and the camera C2 images a region NA within the region WA.

FIG. 4 is a diagram illustrating relationship between an image WG and an image NG. The image WG is an image of the region WA obtained by the camera C1, and the image NG is an image of the region NA obtained by the camera C2. The image NG is an image obtained by imaging the region NA with parallax different from parallax of the camera C1.

In some cases, the vehicle X on which the cameras C1 and C2 are mounted may wobble in a vertical direction during driving or change the course in a left or right direction. At this time, in images obtained by the respective cameras C1 and C2, rolling shutter distortion occurs.

Figure 5:
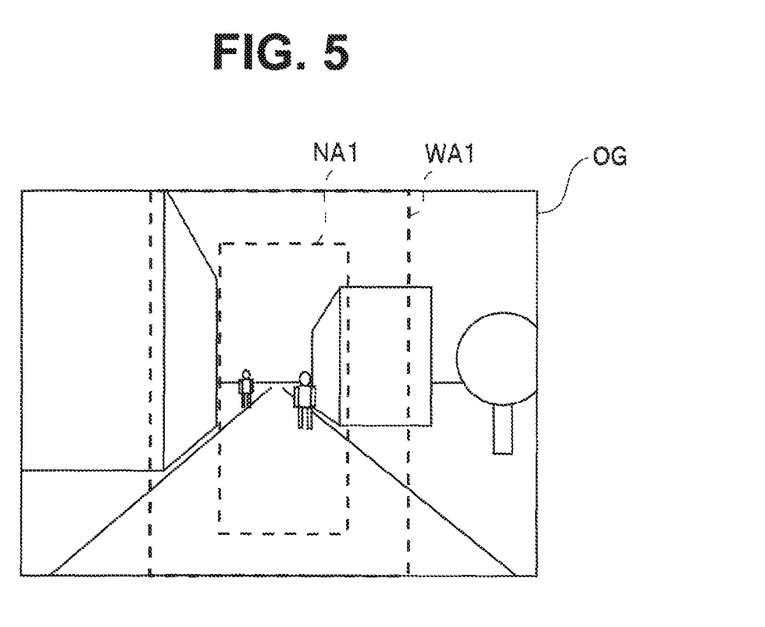
FIG. 5 is a diagram illustrating a range imaged with the cameras C1 and C2 when the cameras C1 and C2 change an imaging direction to a downward direction during imaging according to the present embodiment.
Figure 6:
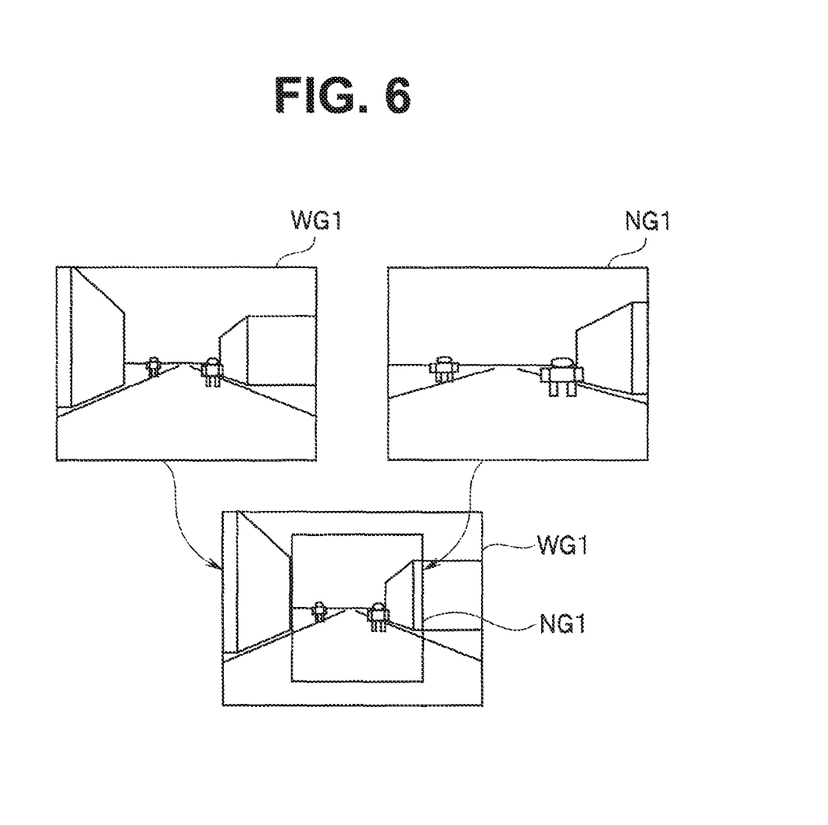
FIG. 6 is a diagram illustrating an example of an image WG1 obtained by the wide-angle camera C1 and an image NG1 obtained by the narrow-angle camera C2 when the cameras C1 and C2 change the imaging direction to the downward direction during imaging, according to the present embodiment.

First, a case where the cameras C1 and C2 wobble in a vertical direction will be described. FIG. 5 is a diagram illustrating a range imaged with the cameras C1 and C2 when the cameras C1 and C2 change an imaging direction to a downward direction during imaging. FIG. 6 is a diagram illustrating an example of an image WG1 obtained by the wide-angle camera C1 and an image NG1 obtained by the narrow-angle camera C2 when the cameras C1 and C2 change the imaging direction to the downward direction during imaging.

For example, when the vehicle X vertically wobbles, the cameras C1 and C2 tilt, and the imaged region expands in a vertical direction. As illustrated in FIG. 5, the cameras C1 and C2 respectively image regions WA1 and NA1 expanding in the vertical direction. Therefore, as illustrated in FIG. 6, the images WG1 and NG1 become images in which a subject image is compressed in the vertical direction and distorted. While a phenomenon that the images are compressed in the vertical direction appears in both the image WG1 and the image NG1, degrees of compression are different from each other.

Figure 7:
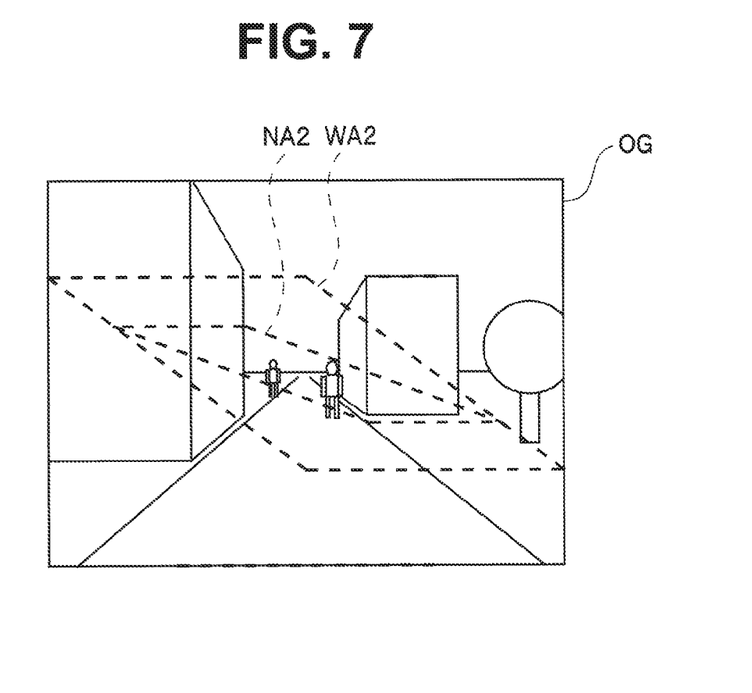
FIG. 7 is a diagram illustrating a range imaged with the cameras C1 and C2 when the cameras C1 and C2 change the imaging direction to a right direction during imaging, according to the present embodiment.
Figure 8:
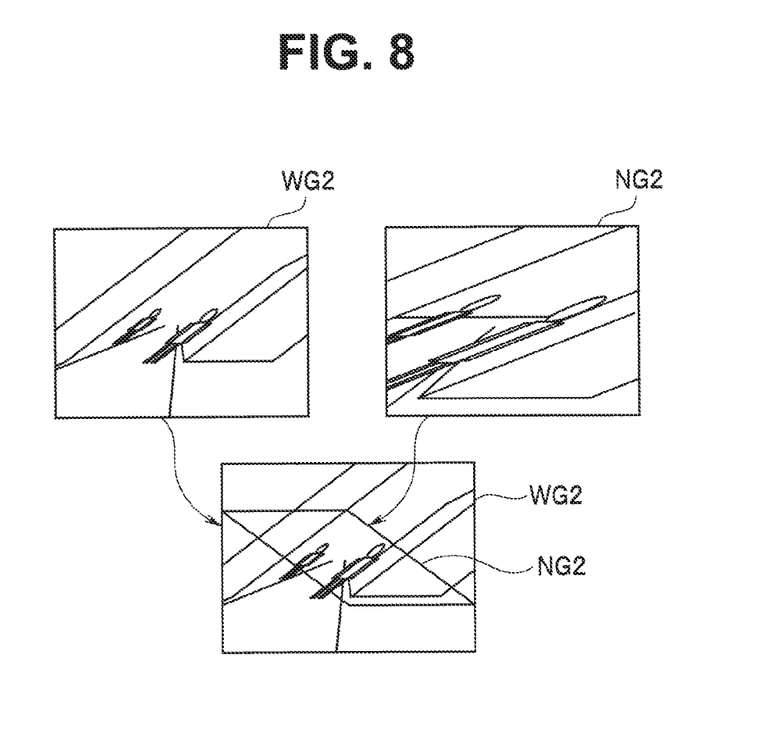
FIG. 8 is a diagram illustrating an example of an image WG2 obtained by the wide-angle camera C1 and an image NG2 obtained by the narrow-angle camera C2 when the cameras C1 and C2 change the imaging direction to the right direction during imaging, according to the present embodiment.

Further, a case where the cameras C1 and C2 change the imaging direction in a horizontal direction is the same as a case where the images are imaged as if the cameras C1 and C2 were panned to a left direction or a right direction. FIG. 7 is a diagram illustrating a range imaged when the cameras C1 and C2 change the imaging direction to a right direction during imaging. FIG. 8 is a diagram illustrating an example of an image WG2 and an image NG2 when the cameras C1 and C2 change the imaging direction to the right direction during imaging.

For example, when the vehicle X makes a sharp turn to the right direction, because images are imaged as if the cameras C1 and C2 were panned, subject images in the imaged regions WA2 and NA2 deform in a diamond shape. As illustrated in FIG. 7, the cameras C1 and C2 image the regions while moving to the right direction. Therefore, as illustrated in FIG. 8, the images WG2 and NG2 become images in which the subject image is obliquely distorted.

Even if pattern recognition for object recognition is performed or stereo matching for distance detection is performed based on the distorted images as illustrated in FIG. 6 or FIG. 8, a problem occurs that an error in recognition or detection becomes large or recognition or detection cannot be performed.

Therefore, the image processing apparatus of the present embodiment generates a correction parameter for correcting the distortion. The image processing apparatus can generate an image without rolling shutter distortion by correcting the distorted image using the correction parameter. Because pattern matching or stereo matching is performed based on the image without rolling shutter distortion, it is possible to prevent an error from becoming large in recognition or detection, and prevent a case where recognition or detection cannot be performed.

(Description of Image Processing)

It is assumed that a position of a point P in real space seen from a certain point is (x, y). When a position of a point $P_w$ obtained by mapping the point P on an image by the camera C1 is $(x_w, y_w)$ a coordinate transform equation of the point P and the point $P_w$ is as expressed in the following affine transform equation (1).

$$\begin{bmatrix} x_w \\ y_w \\ 1 \end{bmatrix} = A_w \begin{bmatrix} x \\ y \\ 1 \end{bmatrix} = \begin{bmatrix} 1 & s & c1 \\ 0 & 1+t & c2 \\ 0 & 0 & 1 \end{bmatrix} \begin{bmatrix} x \\ y \\ 1 \end{bmatrix} \quad (1)$$

Here, $A_w$ is a transform matrix corresponding to rolling shutter distortion. A parameter indicating intensity of shear deformation is represented by s, and a parameter indicating intensity of expansion/contraction in a vertical direction, that is, in a line scan direction is represented by t. Further, c1 is a parallel displacement amount value in an x-axis direction, and c2 is a parallel displacement amount value in a y-axis direction. Note that c1 and c2 may be 0.

In a similar manner, when a position of a point $P_n$ obtained by mapping the point P on an image by the camera C2 is $(x_n, y_n)$, a coordinate transform equation of the point P and the point $P_n$ is as expressed in the following affine transform equation (2).

$$\begin{bmatrix} x_n \\ y_n \\ 1 \end{bmatrix} = CA_n \begin{bmatrix} x \\ y \\ 1 \end{bmatrix} = \begin{bmatrix} r_w & 0 & 0 \\ 0 & r_h & 0 \\ 0 & 0 & 1 \end{bmatrix} \begin{bmatrix} 1 & sr_l & c3 \\ 0 & 1+tr_l & c4 \\ 0 & 0 & 1 \end{bmatrix} \begin{bmatrix} x \\ y \\ 1 \end{bmatrix} \quad (2)$$

Here, C is a transform matrix for addressing a difference in resolution of the imaging devices between the cameras C1 and C2, and $A_n$ is a transform matrix for addressing the rolling shutter distortion. Further, c3 is a parallel displacement amount value in an x-axis direction, and c4 is a parallel displacement amount value in a y-axis direction. Note that c3 and c4 may be 0.

$r_w$ is a ratio of spatial resolution of the camera C1 with respect to the camera C2 in a horizontal direction, and $r_h$ is a ratio of spatial resolution of the camera C1 with respect to the camera C2 in a vertical direction.

The spatial resolution is, here, an angle of view per pixel. In the case where the number of pixels (that is, resolution) of image sensors of the cameras C1 and C2 is the same, a camera with a larger angle of view (field of view) of the whole image has a larger angle for one pixel, and therefore has a larger value of spatial resolution. For example, when an angle of view (field of view) of the camera C1 is 120°, an angle of view of the camera C2 is 60°, and the number of pixels obtained through imaging is the same, $r_w$ and $r_h$ both become 2.

$r_l$ is a ratio of the angle of view of the camera C1 with respect to the camera C2 (θ1/θ2) in the case where the same imaging device is used in the cameras C1 and C2, and the same parameter such as an exposure time period is set, and, for example, when the angle of view (field of view) of the camera C1 is 120° and the angle of view of the camera C2 is 60°, $r_l$ becomes 2.

Note that, here, while the angle of views of the cameras C1 and C2 are different from each other, in the case where the angle of view is the same, $r_l$ becomes a ratio of angular velocity of line scan which sequentially performs exposure for each line. That is $r_l$ is set as a ratio of scan speed in a direction orthogonal to the pixel line.

Here, when positional relationship between the point $P_w$ $(x_w, y_w)$ and the point $P_n$ $(x_n, y_n)$ is modeled through linear transform by affine transform, the positional relationship can be expressed with the following equation (3).

$$\begin{bmatrix} x_w \\ y_w \\ 1 \end{bmatrix} = B \begin{bmatrix} x_n \\ y_n \\ 1 \end{bmatrix} = \begin{bmatrix} B_{00} & B_{01} & B_{02} \\ B_{10} & B_{11} & B_{12} \\ 0 & 0 & 1 \end{bmatrix} \begin{bmatrix} x_n \\ y_n \\ 1 \end{bmatrix} \quad (3)$$

Here, B is a transform matrix. The equation (3) indicates relationship of coordinates between two images obtained by the camera C1 and the camera C2. Note that, while some components in the matrix B are set at 0 or 1 here to stably obtain a solution by reducing the number of parameters, the values of the components do not have to be 0 or 1.

A value of each component of the matrix B can be obtained from an image obtained through actual shooting.

First, characteristic point detection processing is performed on the wide-angle image and the narrow-angle image, and matching is performed between the detected characteristic points. The characteristic point detection processing is executed by the characteristic point detecting circuit 16a, and the characteristic point matching processing is executed by the characteristic point matching circuit 16b.

As methods of the characteristic point detection and characteristic point matching, methods at high speed with high accuracy are desirable, and, for example, AKAZE Feature Descriptor is used. AKAZE Feature Descriptor is disclosed in "Fast Explicit Diffusion for Accelerated Feature in Nonlinear Scale Spaces" Alcantarilla et al. British Machine Vision Conference (BMVC), Bristol, UK, September 2013. Note that the methods of the characteristic point detection and the characteristic point matching are not limited to the method, and, other arbitrary methods may be used.

Therefore, characteristic points in the two images obtained through actual imaging are detected using the characteristic point detecting circuit 16a and the characteristic point matching circuit 16b, and values of a plurality of components of the matrix B can be obtained using position information of the detected plurality of characteristic points.

Coordinates of the matched wide-angle image and narrow-angle image of an i-th (where i is an integer) characteristic point pair are set at $(x_{wi}, y_{wi})$, $(x_{ni}, y_{ni})$. When it is assumed that N characteristic point pairs are found, and coordinate values of respective pairs are substituted in the equation (3), N equations can be developed.

In the case of the equation (3), because the equation has 6 unknowns $B_{00}$ to $B_{12}$, by solving 6 simultaneous equations, 6 unknowns can be calculated. When the equation has a number of N, by solving simultaneous equations using a least-square method, it is possible to determine a value of each component of the matrix B.

If the matrix B is obtained, it is possible to obtain a transform equation of the wide-angle image and the narrow-angle image.

Note that, while the matrix B is obtained by obtaining positions of the characteristic points through characteristic point detection and characteristic point matching, and solving the simultaneous equations of the relational expression (3) of mapping between the wide-angle image and the narrow-angle image using position information of the plurality of characteristic points here, the matrix B may be obtained using other methods.

For example, each component of the matrix B may be obtained using an iterative optimization method of a Lucas-Kanade method. The Lucas-Kanade method is disclosed in "Pyramidal impletation of the affine lucas kanade feature tracker description of the algorithm", Bouguet 2001.

Still further, note that each component of the matrix B may be obtained by performing parameter constraint which limits components of the matrix B only to expansion/reduction and shear deformation.

When the equation (i) and the equation (2) are substituted in the equation (3), the following equation (4) can be obtained, and the equation (5) is developed.

$$A_w \begin{bmatrix} x \\ y \\ 1 \end{bmatrix} = BCA_n \begin{bmatrix} x \\ y \\ 1 \end{bmatrix} \quad (4)$$

$$A_w - BCA_n = 0 \quad (5)$$

Because a total of two equations can be obtained from the first row, the second column and the second row, the second column in the left-hand side of the equation (5) with respect to two unknowns s, t, by solving the simultaneous equations, it is possible to obtain s, t. Each of s, t can be respectively expressed with the following equations (6) and (7).

$$s = \frac{B_{01}r_h(B_{11}r_h r_l - r_l(B_{11}r_h - 1) - 1)}{B_{01}B_{01}r_h^2 r_w - (B_{00}r_l r_w - 1)(B_{11}r_h r_l - 1)} \quad (6)$$

$$t = \frac{-B_{01}B_{10}r_h r_l r_w + (B_{11}r_h - 1)(B_{00}r_l r_w - 1)}{B_{01}B_{01}r_h^2 r_w - (B_{00}r_l r_w - 1)(B_{11}r_h r_l - 1)} \quad (7)$$

It is possible to remove rolling shutter distortion in each of the equation (1) and the equation (2) by using estimated s, t. More specifically, by performing processing of preparing an image plane after distortion is removed, calculating $x_w$, $y_w$, $x_n$ and $y_n$ on the image plane, acquiring pixel data at the positions and storing the pixel data at coordinates x, y of an image after distortion is removed while gradually changing x, y, it is possible to obtain a wide-angle image and a narrow-angle image without distortion.

(Operation)

Operation of the image processing apparatus 1 will be described next.

Figure 9:
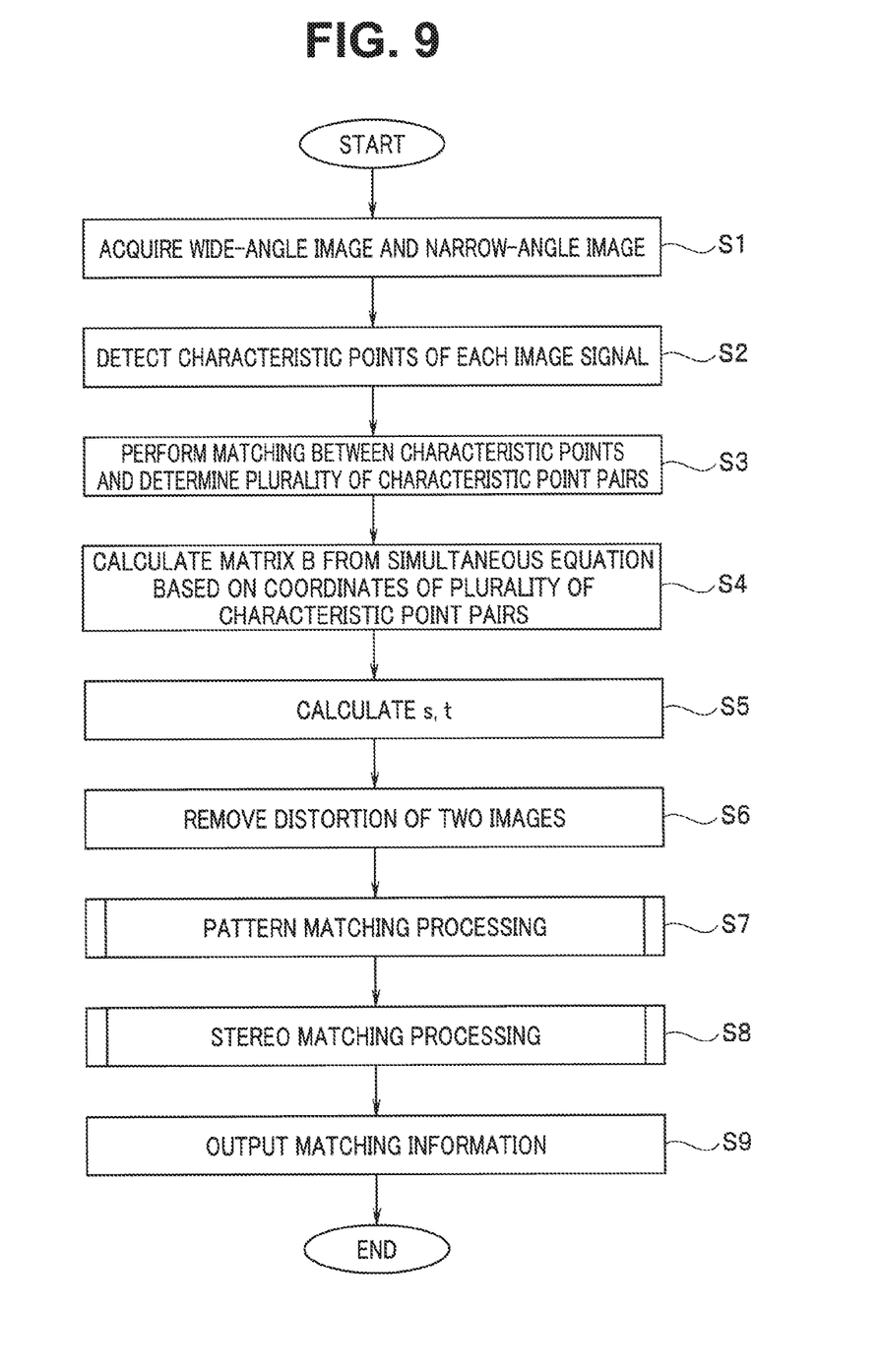
FIG. 9 is a flowchart illustrating an example of flow of processing of the image processing apparatus 1, according to the present embodiment.

FIG. 9 is a flowchart illustrating an example of flow of processing of the image processing apparatus 1. The whole control of the image processing apparatus 1 is performed by the CPU 14.

The CPU 14 controls the image acquiring circuit 13 to acquire a wide-angle image and a narrow-angle image (step (hereinafter, abbreviated as S) 1). Two frame image signals of the wide-angle image and the narrow-angle image are stored in the DRAM 15 from the image acquiring circuit 13 through the bus 21.

The CPU 14 controls the image processing processor 16 to detect characteristic points of each image signal (S2), perform matching between the characteristic points and determine a plurality of characteristic point pairs (S3).

More specifically, the two image signals are forwarded to the image processing processor 16 through the bus 21. The characteristic point detecting circuit 16a detects characteristic points of each of the image signals (S2). Information of the detected plurality of characteristic points is written in the DRAM 15 through the bus 21. The characteristic point matching circuit 16b performs matching on the detected plurality of characteristic points. The characteristic point matching circuit 16b performs processing of determining a plurality of characteristic point pairs between the two images from the matching result (S3). Information of the detected plurality of characteristic point pairs is written in the DRAM 15 through the bus 21.

Therefore, processing of S2 constitutes a characteristic point detecting unit which detects a plurality of characteristic points in a first image and a second image imaged with two cameras having angles of view (or angular velocity of line scan) different from each other. Processing of S3 constitutes a characteristic point pair determining unit which determines a plurality of characteristic point pairs between the first image and the second image from the detected plurality of characteristic points.

The CPU 14 calculates a matrix B from simultaneous equations based on coordinates of the plurality of characteristic point pairs (S4). The CPU 14 calculates the matrix B by executing a program for solving the simultaneous equations. More specifically, the CPU 14 calculates each component of the matrix B by substituting the coordinates of the plurality of characteristic point pairs in the equation (3) and solving the obtained simultaneous equations. As a result, a value of each component of the matrix B which is a mapping parameter between the first image and the second image can be obtained. Therefore, processing of S4 constitutes a mapping parameter calculating unit which calculates the mapping parameter between the first image and the second image.

The CPU 14 then calculates s, t (S5). The CPU 14 calculates s, t by executing a program for executing operation of the equations (6) and (7). That is, processing of S5 constitutes a distortion parameter calculating unit which obtains s, t which are parameters indicating distortion of the first image and the second image from the calculated mapping parameter.

The CPU 14 then controls the affine transform circuit 19 to remove distortion of the two images using the calculated s, t (S6). More specifically, the affine transform circuit 19 generates a correction parameter based on the calculated s, t, and the equation (1) and the equation (2), and removes distortion of the two images.

Image data without distortion is written in the DRAM 15. Therefore, the CPU 14 and the affine transform circuit 19 constitute a distortion removing unit which removes distortion of the wide-angle image and the narrow-angle image using s, t which are parameters indicating distortion.

The CPU 14 performs pattern matching processing (S7) and performs stereo matching processing using information of the pattern matching (S8).

More specifically, the CPU 14 controls the pattern matching circuit 17 to perform pattern matching processing on two pieces of image data without distortion. On each of the wide-angle image and the narrow-angle image, pattern matching processing is performed, and processing of recognizing a person, an obstacle, or the like, is performed.

The CPU 14 controls the stereo matching circuit 18 to perform stereo matching processing using part of the result of the pattern matching processing. On an image region where the wide-angle image overlaps with the narrow-angle image, stereo matching processing is performed, and processing of detecting a distance to a person, an obstacle, or the like, pattern of which is recognized, is performed.

The CPU 14 outputs matching information (S9). The matching information includes pattern matching information which is the result of the pattern matching processing and stereo matching information which is the result of the stereo matching processing. The matching information is output via the I/F 20. That is, the CPU 14 transmits the pattern matching information and the stereo matching information to a control apparatus of a vehicle which is different from the image processing apparatus 1 via the I/F 20. That is, the CPU 14 transmits recognition information of an obstacle, a person, or the like, and information of a distance to the recognized obstacle, or the like, to the control apparatus of the vehicle.

Note that the CPU 14 may output at least one of the pattern matching information and the stereo matching information when the CPU 14 outputs the matching information.

Because the control apparatus of the vehicle can obtain recognition information and detection information with higher accuracy, obtained through pattern matching and stereo matching using the two images without distortion, the control apparatus of the vehicle can control the vehicle more reliably.

As described above, according to the present embodiment, it is possible to provide an image processing apparatus and an image processing method which can detect distortion in images obtained through imaging with two cameras having angles of view or angular velocity of line scan different from each other.

Further, because hardware such as an acceleration sensor for detecting a distortion amount of an image is not required, it is possible to suppress increase of cost.

Note that, while, in the present embodiment, distortion in the two images of the two cameras is detected, the present embodiment can be also applied to a case where distortion in three or more images by three or more cameras is detected. For example, in the case of three images, it is possible to detect distortion between two images, and detect distortion of the remaining image on the basis of the detected distortion parameter.

Still further, note that, while, in the present embodiment, image distortion removal processing (S6) is performed using the calculated s, t, a threshold of each of s, t may be set in advance, and, when at least one or both of the calculated s, t is equal to or greater than the threshold, distortion removal processing may not be performed and processing after S6 may be stopped. That is, when a parameter indicating distortion is equal to or greater than a predetermined threshold, the affine transform circuit 19 which is a distortion removing unit does not remove distortion of the first image and the second image. Processing after S6 may be performed when s, t for the input frame images become smaller than the thresholds.

This is because it is considered that images in which s, t are equal to or greater than the thresholds are inappropriate for the subsequent image processing. The images in which s, t are equal to or greater than the thresholds may have degraded quality even if distortion removal processing is performed, and if image recognition processing is performed by utilizing the images with degraded quality, it is possible that recognition accuracy may degrade.

Therefore, because distortion removal processing and matching processing are not performed on the images in which s, t are equal to or greater than the thresholds, it is possible to prevent degradation of accuracy of image recognition processing.

Further, while, in the present embodiment, a wide-angle image and a narrow-angle image without distortion are generated at the image processing apparatus 1, processing of S6 may be performed using a control circuit, a chip, or the like, different from the image processing apparatus 1.

Still further, while, in the present embodiment, pattern matching processing and stereo matching processing are performed at the image processing apparatus 1, processing of at least one of S7 and S8 may be performed using a control circuit, a chip, or the like, different from the image processing apparatus 1.

Therefore, processing of at least one of S6 to S8 may be performed using a control circuit, a chip, or the like, different from the image processing apparatus 1. In the case where all the processing from S6 to S8 is performed using a control circuit, a chip, or the like, different from the image processing apparatus 1, the image processing apparatus 1 only has to output information of s, t. In this case, the image processing apparatus 1 becomes an apparatus which estimates distortion in images imaged in a rolling shutter scheme.

Further, while, in the present embodiment, the image processing apparatus 1 is an apparatus for a forward-looking system for vehicle, the image processing apparatus 1 can be applied to use application other than forward-looking, and can be further applied to use application other than a vehicle, such as a stereo video camera and a stereo digital still camera.

Each "unit" in the present specification is conceptual expression corresponding to each function in the embodiment, and does not always correspond to specific hardware and software routine on a one-to-one basis. Therefore, in the present specification, the embodiment has been described assuming a virtual circuit block (unit) having each function of the embodiment. Further, execution order of respective steps in each procedure in the present embodiment may be changed, or a plurality of steps may be executed at the same time, or the respective steps may be executed in order different for every execution unless it is contrary to property. Further, all or part of the respective steps in each procedure in the present embodiment may be implemented with hardware.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a characteristic point detecting circuit configured to detect a plurality of characteristic points in a first image and a second image imaged with two cameras having angles of view or angular velocity of line scan different from each other;
   a characteristic point pair determining circuit configured to determine a plurality of characteristic point pairs between the first image and the second image from the detected plurality of characteristic points; and
   a Central Processing Unit (CPU),
   wherein the Central Processing Unit (CPU) is configured to: calculate a first parameter indicating mapping between the first image and the second image by using information of the plurality of characteristic point pairs between the first image and the second image; and
   obtain a second parameter for removing a first distortion of the first image and a second distortion of the second image, from the first parameter,
   wherein the first distortion and the second distortion are caused by image sensors of the two cameras.

2. The image processing apparatus according to claim 1, wherein the first image is an image obtained by a first optical system having a first angle of view, and the second image is an image obtained by a second optical system having a second angle of view different from the first angle of view.

3. The image processing apparatus according to claim 1, wherein the second parameter is at least one of a parameter indicating intensity of shear deformation and a parameter indicating intensity of expansion or contraction in a direction of the line scan.

4. The image processing apparatus according to claim 1, further comprising:
   a distortion removing circuit configured to remove distortion of the first image and distortion of the second image using the second parameter.

5. The image processing apparatus according to claim 1, further comprising:
   a matching circuit configured to perform at least one of pattern matching and stereo matching on the first image and the second image,
   wherein a matching result of the at least one of the pattern matching and the stereo matching of the matching circuit is output.

6. An image processing method comprising: detecting a plurality of characteristic points in a first image and a second image imaged with two cameras having angles of view or angular velocity of line scan different from each other;
   determining a plurality of characteristic point pairs between the first image and the second image from the detected plurality of characteristic points; calculating a first parameter indicating mapping between the first image and the second image by using information of the plurality of characteristic point pairs between the first image and the second image; and
   obtaining a second parameter for removing a first distortion of the first image and a second distortion of the second image, the second distortion differing in degree from the first distortion, from the calculated first parameter, wherein the first distortion and the second distortion are caused by image sensors of the two cameras.

7. The image processing method according to claim 6, wherein the first image is an image obtained by a first optical system having a first angle of view, and
   the second image is an image obtained by a second optical system having a second angle of view different from the first angle of view.

8. The image processing method according to claim 6, wherein the second parameter is at least one of a parameter indicating intensity of shear deformation and a parameter indicating intensity of expansion or contraction in a direction of the line scan.

9. The image processing method according to claim 6, further comprising:
   removing distortion of the first image and distortion of the second image using the second parameter.

10. The image processing method according to claim 6, further comprising:
    performing at least one of pattern matching and stereo matching on the first image and the second image; and
    outputting a matching result of the at least one of the pattern matching and the stereo matching.

11. An image processing apparatus comprising:
    a characteristic point detecting circuit configured to detect a plurality of characteristic points in a first image and a second image imaged with two cameras having angles of view or angular velocity of line scan different from each other, wherein the first image is an image obtained by a first optical system having a first angle of view, and the second image is an image obtained by a second optical system having a second angle of view different from the first angle of view;

a characteristic point pair determining circuit configured to determine a plurality of characteristic point pairs between the first image and the second image from the detected plurality of characteristic points; and a Central Processing Unit (CPU), wherein the Central Processing Unit (CPU) is configured to: calculate a first parameter indicating mapping between the first image and the second image by using information of the plurality of characteristic point pairs between the first image and the second image; and obtain a second parameter that is a parameter for removing first distortion of the first image and a second distortion of the second image, the second distortion differing in degree from the first distortion, from the first parameter, the second parameter being at least one of a parameter indicating intensity of shear deformation and a parameter indicating intensity of expansion or contraction in a direction of the line scan.

12. The image processing apparatus according to claim 11, further comprising:

a distortion removing circuit configured to remove distortion of the first image and distortion of the second image using the second parameter.

13. The image processing apparatus according to claim 11, further comprising:

a matching circuit configured to perform at least one of pattern matching and stereo matching on the first image and the second image, wherein a matching result of the at least one of the pattern matching and the stereo matching of the matching circuit is output.

14. The image processing apparatus of claim 11, wherein the first distortion and the second distortion are caused by image sensors of the two cameras.

* * * * *